US012749969B2

(12) United States Patent
Shan et al.

(10) Patent No.: US 12,749,969 B2
(45) Date of Patent: Sep. 29, 2026

(54) CONTROLLER FOR RESONANT CONVERTER

(71) Applicant: Renesas Design (UK) Limited, Bourne End (GB)

(72) Inventors: Keyue Shan, San Jose, CA (US); Yu Rong, San Jose, CA (US); Guang Feng, San Jose, CA (US); Kai-Wen Chin, San Jose, CA (US)

(73) Assignee: Renesas Design (UK) Limited, Bourne End (GB)

( * ) Notice: Subject to any disclaimer, the term of this patent is extended or adjusted under 35 U.S.C. 154(b) by 155 days.

(21) Appl. No.: 18/947,144

(22) Filed: Nov. 14, 2024

(65) Prior Publication Data

US 2026/0135475 A1 May 14, 2026

(51) Int. Cl.

| | |
|---|---|
| ***H02M 3/00*** | (2006.01) |
| ***H02M 1/00*** | (2006.01) |
| ***H02M 1/08*** | (2006.01) |
| ***H02M 1/32*** | (2007.01) |
| ***H02M 3/07*** | (2006.01) |
| ***H02M 3/335*** | (2006.01) |

(52) U.S. Cl.

CPC ........... *H02M 3/01* (2021.05); *H02M 1/0032* (2021.05); *H02M 1/08* (2013.01); *H02M 1/32* (2013.01); *H02M 3/07* (2013.01); *H02M 3/33571* (2021.05)

(58) Field of Classification Search

CPC ...... H02M 3/01; H02M 3/07; H02M 3/33571; H02M 1/08; H02M 1/0032; H02M 1/32

USPC .......................................................... 363/21

See application file for complete search history.

(56) References Cited

U.S. PATENT DOCUMENTS

| | | | | |
|---|---|---|---|---|
| 8,345,450 | B2 * | 1/2013 | Yan | H02M 3/01 363/16 |
| 10,250,126 | B1 * | 4/2019 | Chen | H02M 7/08 |
| 12,592,644 | B2 * | 3/2026 | Chen | H02M 1/0058 |
| 2017/0331386 | A1 * | 11/2017 | Babazadeh | H02M 3/3376 |
| 2020/0083817 | A1 * | 3/2020 | Liu | H02M 1/08 |
| 2022/0255442 | A1 * | 8/2022 | Morrison | H02M 1/0048 |

* cited by examiner

*Primary Examiner* — Yemane Mehari

(74) *Attorney, Agent, or Firm* — SCULLY, SCOTT, MURPHY & PRESSER, P.C.

(57) ABSTRACT

A controller for a resonant converter is provided. The resonant converter includes a first switch, a resonant tank coupled to the first switch at a switching node, and a first capacitor. The controller is configured to operate in a first mode by providing a plurality of first periodic control pulses to drive the switching of the first switch at a first switching frequency. The controller is further configured to operate in a second mode by providing the plurality of first periodic control pulses to drive the switching of the first switch at a second switching frequency, the second switching frequency being less than the first switching frequency, or stopping providing the first periodic control pulses, and providing one or more first charging pulses, each of the one or more first charging pulses driving the switching of the first switch to charge the first capacitor.

20 Claims, 7 Drawing Sheets

CONTROLLER FOR RESONANT CONVERTER

FIELD

The present disclosure relates to a controller for a resonant converter.

BACKGROUND

Resonant converters, such as asymmetrical half-bridge converters and LLC converters, may be controlled differently depending on the load conditions. For example, to optimize efficiency at light load operating conditions, known resonant converters transition from pulse width modulation (PWM) to pulse frequency modulation (PFM) control.

SUMMARY

It is desirable to provide an improved controller for a resonant converter.

It is desirable to provide an improved controller for a resonant converter that can provide an improved dynamic load response performance and/or better light load efficiency of the converter, when compared to known systems.

According to a first aspect of the disclosure there is provided a controller for a resonant converter, the resonant converter comprising a first switch, a resonant tank coupled to the first switch at a switching node, and a first capacitor, wherein the controller is configured to operate in a first mode by i) providing a plurality of first periodic control pulses to drive the switching of the first switch at a first switching frequency, operate in a second mode by i) providing the plurality of first periodic control pulses to drive the switching of the first switch at a second switching frequency, the second switching frequency being less than the first switching frequency, or stopping providing the first periodic control pulses, and ii) providing one or more first charging pulses, each of the one or more first charging pulses driving the switching of the first switch to charge the first capacitor.

Optionally, the first charging pulses comprises a plurality of periodic first charging pulses.

Optionally, a first pulse width and/or a first charging pulse frequency of the periodic first charging pulses is determined based on a capacitance of the first capacitor and/or a resistance of a first discharge resistor.

Optionally, the controller comprises a first gate driver configured to provide the one or more first charge pulses to the first switch, and a first detector configured to detect a first voltage across the first capacitor, and determine whether the first voltage is below a first threshold value, provide a first control signal to the first gate driver when the first voltage is below the first threshold value, wherein the first gate driver is configured to provide the one or more first charge pulses to the first switch to charge the first capacitor in response to receiving the first control signal from the first detector.

Optionally, the controller comprises an isolation circuit for providing electrical isolation, the first control signal being provided to the first gate driver via the isolation circuit.

Optionally, the resonant converter comprises a second switch coupled to the switching node, and a second capacitor.

Optionally, the controller is configured to operate in the first mode by i) providing a plurality of periodic second control pulses to drive the switching of the second switch at a third switching frequency, operate in a second mode by i) providing the plurality of periodic second control pulses to drive the switching of the second switch at a fourth switching frequency, the fourth switching frequency being less than the third switching frequency, or stopping providing the second periodic control pulses, and ii) providing one or more second charging pulses, each of the one or more second charging pulses driving the switching of the second switch to charge the second capacitor.

Optionally, the controller is configured to drive the switching of the first and second switches such that both the first and second switches are not simultaneously on an on state.

Optionally, the first charging pulses comprises a plurality of periodic first charging pulses, and/or the second charging pulses comprises a plurality of periodic second charging pulses.

Optionally, a first pulse width and/or a first charging pulse frequency of the periodic first charging pulses is determined based on a capacitance of the first capacitor and/or a resistance of a first discharge resistor, and/or a second pulse width and/or a second charging pulse frequency of the periodic second charging pulses is determined based on a capacitance of the second capacitor and/or a resistance of a second discharge resistor or the load current discharged from the second capacitor or the load current to the second capacitor.

Optionally, the controller comprises a first gate driver configured to provide the one or more first charge pulses to the first switch, a second gate driver configured to provide the one or more second charge pulses to the second switch, a first detector configured to detect a first voltage across the first capacitor, and determine whether the first voltage is below a first threshold value, provide a first control signal to the first gate driver when the first voltage is below the first threshold value, and a second detector configured to detect a second voltage across the second capacitor, and determine whether the second voltage is below a second threshold value, provide a second control signal to the second gate driver when the second voltage is below the second threshold value, wherein the first gate driver is configured to provide the one or more first charge pulses to the first switch to charge the first capacitor in response to receiving the first control signal from the first detector, and the second gate driver is configured to provide the one or more second charge pulses to the second switch to charge the second capacitor in response to receiving the second control signal from the second detector.

Optionally, the controller comprises a first isolation circuit for providing electrical isolation, the first control signal being provided to the first gate driver via the first isolation circuit, and/or a second isolation circuit for providing electrical isolation, the second control signal being provided to the second gate driver via the second isolation circuit.

Optionally, the first switch is a high side switch, the second switch is a low side switch, the first capacitor is a resonant capacitor, the resonant tank comprising the first capacitor, and the second capacitor is a bootstrap capacitor.

Optionally, the resonant converter comprises a first resistor configured to be coupled to a supply voltage, a first diode coupled to the first resistor and the second capacitor, wherein the resonant tank comprises a first inductor coupled to the switching node and the first capacitor, and the second capacitor is coupled to the switching node.

Optionally, the first detector is configured to detect a first voltage across the first capacitor by sensing a switching node voltage at the switching node or at a first capacitor node, and the second detector is configured to detect a second voltage across the second capacitor by sensing the switching node voltage and a bootstrap voltage at a bootstrap node between the first diode and the second capacitor.

Optionally, the resonant converter is an asymmetrical half-bridge resonant converter.

Optionally, the second mode is a low power mode in which the resonant converter operates to provide a reduced load current when compared to the first mode.

Optionally, the controller is configured to provide pulse frequency modulation (PFM) during the first and/or second mode.

According to a second aspect of the disclosure there is provided an apparatus comprising a resonant converter comprising a first switch, a resonant tank coupled to the first switch at a switching node, and a first capacitor, and a controller configured to operate in a first mode by i) providing a plurality of first periodic control pulses to drive the switching of the first switch at a first switching frequency, operate in a second mode by i) providing the plurality of first periodic control pulses to drive the switching of the first switch at a second switching frequency, the second switching frequency being less than the first switching frequency, or stopping providing the first periodic control pulses, and ii) providing one or more first charging pulses, each of the one or more first charging pulses driving the switching of the first switch to charge the first capacitor.

It will be appreciated that the apparatus of the second aspect may include features set out in relation to the first aspect and may include other features as described herein, in accordance with the understanding of the skilled person.

According to a third aspect of the disclosure there is provided a method of controlling a resonant converter, the resonant converter comprising a first switch, a resonant tank coupled to the first switch at a switching node, and a first capacitor, wherein the method comprises operating a controller in a first mode in which the controller i) provides a plurality of first periodic control pulses to drive the switching of the first switch at a first switching frequency, operating in the controller in a second mode in which the controller i) provides the plurality of first periodic control pulses to drive the switching of the first switch at a second switching frequency, the second switching frequency being less than the first switching frequency, or stops providing the first periodic control pulses, and ii) provides one or more first charging pulses, each of the one or more first charging pulses driving the switching of the first switch to charge the first capacitor.

It will be appreciated that the method of the third aspect may include using and/or providing features set out in relation to the first and/or second aspects and may include other features as described herein, in accordance with the understanding of the skilled person.

BRIEF DESCRIPTION OF THE DRAWINGS

The disclosure is described in further detail below by way of example and with reference to the accompanying drawings in which.

DETAILED DESCRIPTION

Figures 1A, 1B, 1C:
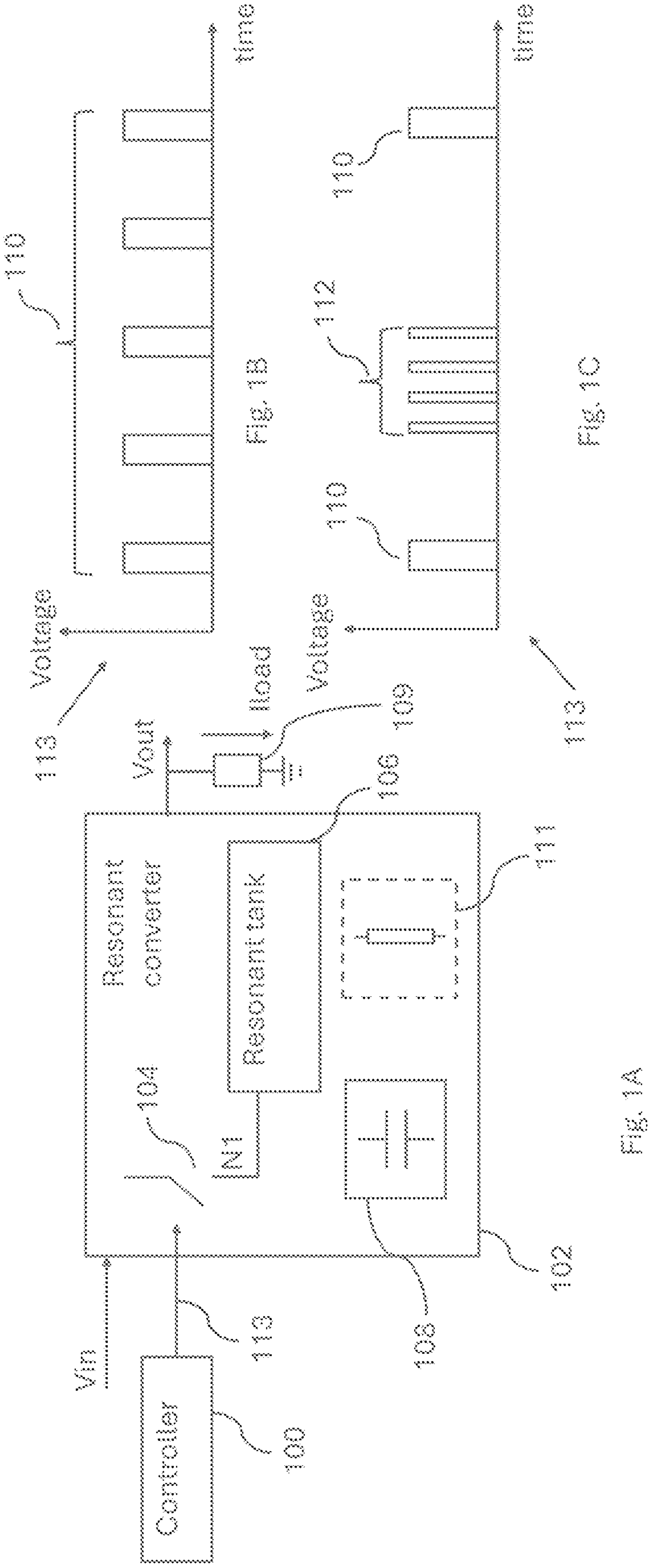
FIG. 1A is a schematic of a controller for a resonant converter in accordance with a first embodiment of the present disclosure.
FIG. 1B is a timing graph showing a first driving signal as may be provided by the controller whilst operating in a first mode.
FIG. 1C is a timing graph showing the first driving signal as may be provided by the controller whilst operating in a second mode.

Known resonant converter transition from pulse width modulation (PWM) to pulse frequency modulation (PFM) control to optimise efficiency during light load conditions. Under PFM control, the pulse frequency is reduced. Under very light load conditions, the switching frequency is greatly lowered to maintain a balance of the internal power dissipation, output load and the output voltage. Under no-load conditions, the switching frequency enters a burst mode, where there are long periods between switching cycles. A low power mode typically means that there is a long waiting period between switching cycles. For example, the waiting period may be much greater than 1 ms.

Known resonant converters comprise a bootstrap capacitor and a resonant capacitor. When there are no switching cycles, both the bootstrap capacitor voltage and the resonant capacitor voltage decays. The bootstrap capacitor discharges through a boot pin leakage current, and a discharge resistor in parallel with the resonant capacitor acts to discharge the resonant capacitor. As a result, the bootstrap voltage and the resonant capacitor voltage may both drop to low levels between switching cycles.

When a load transition happens at a low power waiting period, the resonant converter cannot deliver the energy to the load side in a reasonable time because time is required to charge up each of the bootstrap capacitor voltage and the resonant capacitor voltage. This can result in a poor output voltage undershoot performance.

It is necessary to maintain the high enough bootstrap capacitor voltage and resonant capacitor voltage Vcr during a low power mode to have good dynamic load response performance, with sufficient energy inside the bootstrap capacitor, after the integrated circuit (IC) wakes up from a no switching period, to send out a high side gate signal without extra charging time.

In the meantime, with enough resonant capacitor voltage, energy can be quickly delivered to secondary side without extra time being required to charge the resonant capacitor.

A known method of keeping a bootstrap capacitor voltage above its under voltage lock out (UVLO) level while also keeping resonant capacitor voltage level is by limiting the low power mode waiting period. This may be achieved by clamping the minimum switching frequency. Since the switching frequency cannot be as low as possible, fake load resistor may be added in the output side, in order to consume the extra power delivered due to relatively higher switching frequency. The light load power consumption is relatively high. Higher switching frequency will result in relatively more power delivered to the output side, which could be higher than the required output power. As a result, fake load resistor may be used at output side to consume the extra power. Then, the light load/no load efficiency is compromised.

Although the implementation of the known system is easy, the disadvantage of using this method is that the no/light load efficiency is low since the power converter needs to turn on the high side and the low side switch at a specific average switching frequency without any output loading.

FIG. 1A is a schematic of a controller 100 for a resonant converter 102 in accordance with a first embodiment of the present disclosure. The resonant converter 102 comprises a switch 104, a resonant tank 106 coupled to the switch 104 at a switching node N1, and a capacitor 108. The resonant converter 102 may, for example, be an asymmetrical half-bridge resonant converter.

During operation the resonant converter 102 receives an input voltage Vin, generates an output voltage Vout and provides a load current Iload to an electrical load 109. The repeated switching of the switch 104 acts to transfer power from the input voltage Vin to the resonant tank 106 to generate the output voltage Vout.

The resonant converter 102 may comprise a discharge resistor 111 which provides a discharge path for the capacitor 108.

FIG. 1B is a timing graph showing a first driving signal 113 comprising first control pulses 110 as may be provided by the controller 100 to the switch 104 whilst operating in a first mode. The first control pulses 110 drive the switching of the switch 104. For example, a first control pulse 110 being received at the switch 104 may turn the switch "on" such that it can permit current flow, with the switch 104 otherwise being in an "off" state, where current flow is prevent. The switch 104 may, for example, be implemented using a transistor, with a driving signal comprising the control pulses being provided to its gate terminal, to drive its switching operation. The first control pulses 110 are periodic and have a frequency fc1.

FIG. 1C is a timing graph showing the first driving signal 113 comprising the first control pulses 110 and first charging pulses 112 as may be provided by the controller 100 to the switch 104 whilst operating in a second mode. In the second mode, the first control pulses 110 have a frequency fc2 which is less than the frequency fc1 during the first mode. In a further embodiment, during the second mode, the controller 100 may stop providing the first control pulses 110.

The second mode may be a low power mode in which the resonant converter 102 operates to provide a reduced current when compared to the first mode, the first mode being, for example, a normal mode. The controller 100 may be configured to provide pulse frequency modulation (PFM) during the first and/or second modes.

Whilst operating in the second mode, the controller 100 provides the first charging pulses 112 which drive the switching of the switch 104 to charge the capacitor 108. In the present example there is shown a plurality of periodic first charging pulses 112. However, in a further embodiment there may be provided a single first charging pulse 112.

The controller 100 may provide the first charging pulses 112 having a first pulse width that is determined based on a capacitance of the capacitor 108 and/or a resistance of the discharge resistor 111. The controller may provide the first charging pulses 112 having a first charging pulse frequency that is determined based on the capacitance of the capacitor 108 and/or the resistance of the discharge resistor 111.

Figure 1E:
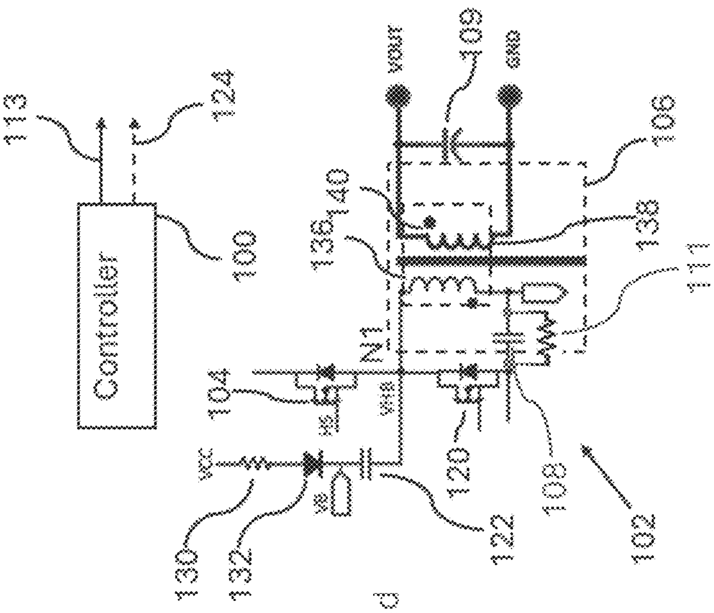
FIG. 1E is a schematic of the controller and a specific embodiment of the resonant converter, in accordance with a third embodiment of the present disclosure.
Figure 1D:
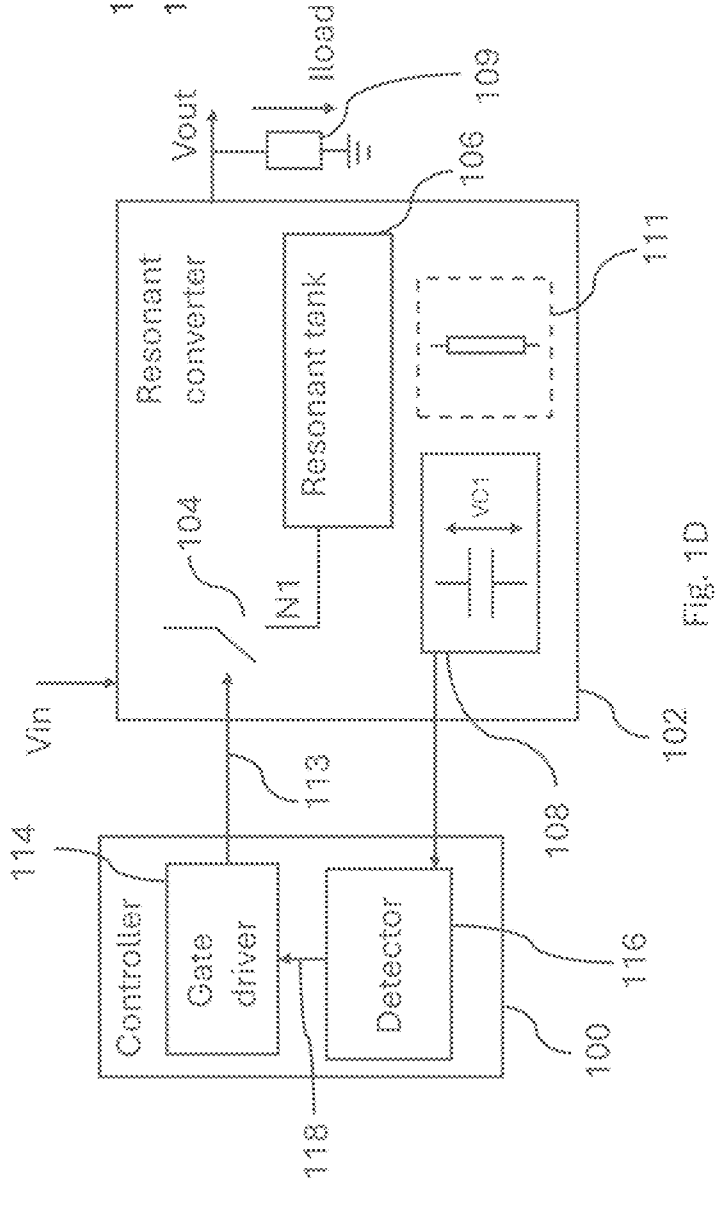
FIG. 1D is a schematic of a specific embodiment of the controller and the resonant converter in accordance with a second embodiment of the present disclosure.

FIG. 1D is a schematic of a specific embodiment of the controller 100 and the resonant converter 102 in accordance with a second embodiment of the present disclosure. In the present example, the controller comprises a first gate driver 114 that is configured to provide the first charging pulses 112 to the switch 104. It will be appreciated that the first gate driver 114 may also provide the first control pulses 110 to the switch 104.

The controller 100 further comprises a detector 116 that is configured to detect a voltage VC1 across the capacitor 108 and determine whether the voltage VC1 is below a first threshold voltage value. The voltage VC1 being less than the first threshold voltage value can indicate that the capacitor 108 has been discharged to a level that that could be detrimental to the operation of the resonant converter 100. The detector 116 is further configured to provide a control signal 118 to the gate driver 114 when the voltage VC1 is below the first threshold voltage value. During operation, when the gate driver 114 receives the control signal 118 indicating that the capacitor 108 has been discharged below the first threshold voltage value, the gate driver 114 provides the first charge pulses 112 to the switch 104 to control the switch 104 to charge the capacitor 108. FIG. 1E is a schematic of the controller 100 and a specific embodiment of the resonant converter 102, in accordance with a third embodiment of the present disclosure. The resonant converter 102 further comprises a switch 120 coupled to the switching node N1 and a capacitor 122.

In the present embodiment the capacitor 108 is a resonant capacitor that is part of the resonant tank 106, the switch 104 is a high side switch, the capacitor 122 is a bootstrap capacitor, and the switch 120 is a low side switch. The voltage VC1 across the capacitor 108 may be denoted as Vcr. During operation, the controller 100 is configured to provide the first charging pulses 112 to drive the switching of the high side switch (the switch 104) to charge the resonant capacitor (the capacitor 108), when operating in the second mode. The controller 100 may provide the first charging pulses 112 in response to the voltage VC1 falling below the first threshold voltage value.

In an alternative embodiment, the capacitor 108 may be a bootstrap capacitor, the switch 104 is a low side switch, the capacitor 122 is a resonant capacitor and the switch 120 is a high side switch. The voltage VC1 across the capacitor 108 is equal to a bootstrap voltage VB minus a switching node voltage VHB, in the present example. In the present example, VC1 is the bootstrap capacitor voltage which is equal to VB−VHB.

During operation, the controller 100 is configured to provide the first charging pulses 112 to drive the switching of the low side switch (the switch 104) to charge the bootstrap capacitor (the capacitor 108), when in the second mode. The controller 100 may provide the first charging pulses 112 in response to the voltage VC1 falling below the first threshold voltage value.

It will be appreciated that in a further specific embodiment, the controller 100 may be configured to provide charging pulses for charging both of the capacitors 108, 122 as required.

For example, we return to the present embodiment where the capacitor 108 is the resonant capacitor, the switch 104 is the high side switch, the capacitor 122 is the bootstrap capacitor, and the switch 120 is the low side switch.

The controller 100 may be configured provide the first driving signal 113 to the switch 104, with the first charging pulses 112 being provided during the second mode, thereby resulting in the charging of the capacitor 108.

Figure 1F:
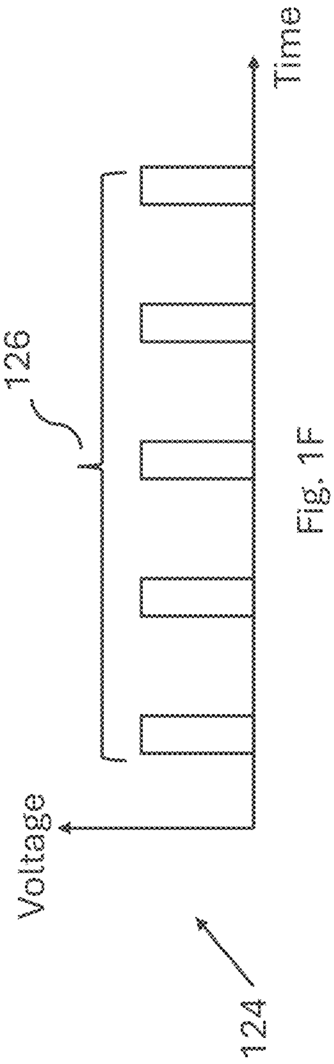
FIG. 1F is a timing graph showing a second driving signal as may be provided by the controller whilst operating in the first mode.

FIG. 1F is a timing graph showing a second driving signal 124 comprising second control pulses 126 as may be provided by the controller 100 to the switch 120 whilst operating in the first mode. The second control pulses 126 drive the switching of the switch 120. For example, a second control pulse 126 being received at the switch 120 may turn the switch "on" such that it can permit current flow, with the switch 120 otherwise being in an "off" state, where current flow is prevent. The switch 120 may, for example, be implemented using a transistor, with a driving signal comprising the control pulses being provided to its gate terminal, to drive its switching operation. The second control pulses 126 are periodic and have a frequency fc3.

Figure 1G:
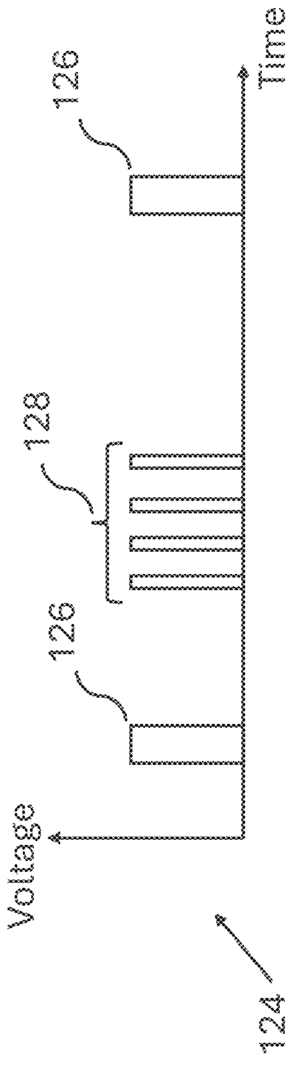
FIG. 1G is a timing graph showing the second driving signal as may be provided by the controller whilst operating in a second mode.

FIG. 1G is a timing graph showing the second driving signal 124 comprising the second control pulses 126 and second charging pulses 128 as may be provided by the controller 100 to the switch 120 whilst operating in a second mode. In the second mode, the second control pulses 126 have a frequency fc4 which is less than the frequency fc3 during the first mode. In a further embodiment, during the second mode, the controller 100 may stop providing the second control pulses 126.

Whilst operating in the second mode, the controller 100 provides the second charging pulses 128 which drive the switching of the switch 120 to charge the capacitor 122. In the present example there is shown a plurality of periodic second charging pulses 128. However, in a further embodiment there may be provided a single second charging pulse 128.

The controller 100 may be configured drive the switching of the switches 104, 120 such that both switches 104, 120 are not simultaneously in an on state.

The resonant converter 102 may further comprise a resistor 130 coupled to a supply voltage VCC, and a diode 132 coupled to the resistor 130 and the capacitor 122. The resonant tank 106 may further comprise an inductor 136 coupled to the switching node N1 and the capacitor 108. The capacitor 122 may be coupled to the switching node N1. The resonant tank 106 may comprise a transformer 138 comprising the inductor 136 and an inductor 140.

Embodiments of the present disclosure may provide methods for charging a bootstrap capacitor and a resonant capacitor at no/light load condition. Consideration should be given to:

1. The timing to charge bootstrap capacitor.
2. The timing to sample and charge resonant capacitor.

The resonant capacitor (the capacitor 108) may be charged during a low power mode by providing the first charging pulses 112 to the high side switch (the switch 104). To charge the capacitor voltage, the high side switch may be turned on for a short time.

For an indirect sensing method for the resonant capacitor voltage Vcr, the first threshold voltage value may be varied depending on the application. For a higher threshold, more frequent first charging pulses 112 will require to be sent to the switch 104 during the low power mode. An estimation of the discharge time of the resonant capacitor 108 may be made using the following equation:

$$\tau = Cr \times R \tag{1}$$

τ is a time constant which represents the time taken for the capacitor 108 to discharge by approximately 60%, Cr is the capacitance of the resonant capacitor 108, and R is a resistance of the discharge resistor 111 in parallel with the resonant capacitor 108 (not shown). An estimate of the pulse width (an ON time of the high side switch) of the charging pulses 112 and/or the first charging pulse frequency (which may be referred to as a "sample frequency") may be determined using t as calculated using equation (1).

A resonant capacitor typically discharges during a no switching period (during a low power mode) through a resistor in parallel with the resonant capacitor or through an AHB switching node sensing resistor. Typically, there is provided a parallel discharge resistor with the resonant capacitor for safety concern. In the present example, the discharge resistor 111 is in parallel with the resonant capacitor 108.

The bootstrap capacitor (the capacitor 122) may be charged during a low power mode by providing second charging pulses 128 to the low side switch (the switch 120). For an indirect sensing method the pulse width of the second charging pulses 128 may be determined using the following equation:

$$C \times \frac{dV}{dt} = I \tag{2}$$

where C is the capacitance of the bootstrap capacitor (the capacitor 122), dV=VCC−VB, and I=dV/R(130), where R(130) is the resistance of the resistor 130. dt is the change in time to be controlled to provide the pulse width of the second charging pulses 128.

The second charging pulses 128 may be sent to the low side switch 120 periodically. In a specific embodiment, to maintain the bootstrap capacitor voltage, where the bootstrap capacitor voltage is equal to VB−VHB, only a second charging pulse may be sent during the low power mode. The second charging pulses 128 may be sent periodically.

Figure 2A:
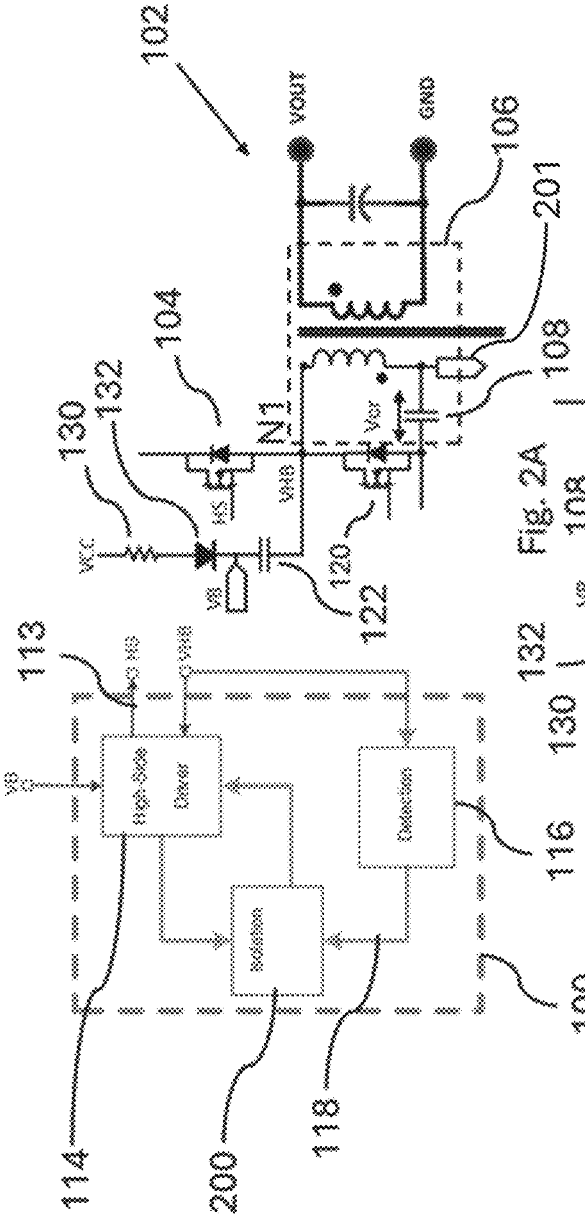
FIG. 2A is a schematic of a specific embodiment of the controller and the resonant converter in accordance with a fourth embodiment of the present disclosure.

FIG. 2A is a schematic of a specific embodiment of the controller 100 and the resonant converter 102 in accordance with a fourth embodiment of the present disclosure. The present embodiment relates to direct sensing of the voltage across the capacitor 108 using the detector 116.

In the present embodiment the capacitor 108 is a resonant capacitor that is part of the resonant tank 106, the switch 104 is a high side switch, the capacitor 122 is a bootstrap capacitor, and the switch 120 is a low side switch. The voltage VC1 across the capacitor 108 may be denoted as Vcr. During operation, the controller 100 is configured to provide the first charging pulses 112 to drive the switching of the high side switch (the switch 104) to charge the resonant capacitor (the capacitor 108), when operating in the second mode. The controller 100 may provide the first charging pulses 112 in response to the voltage VC1 falling below the first threshold voltage value.

The voltage VC1 across the capacitor 108 may be measured either from VHB or directly from Vcr itself, depending on application circuit and IC design. For example, the resonant capacitor voltage Vcr may be sensed directly from a positive node 201 from the resonant capacitor with an additional IC pin.

In the present embodiment, the controller 100 comprises an isolation circuit 200 for providing electrical isolation. The control signal 118 is provided to the gate driver 114 via the isolation circuit 200.

For the direct sensing method for the resonant capacitor voltage Ver of the present embodiment, a threshold value for triggering the providing of the charging pulses 112 may be dependent on application. During the low power mode, the resonant capacitor voltage Vcr may be detected at a certain pre-defined period. During this detection period, the sensed resonant capacitor Ver will be compared with the threshold value to determine if a high side charging pulse needs to be sent to maintain the resonant capacitor voltage Vcr. The higher the threshold, the more frequent first charging pulses need to be sent.

Figure 2B:
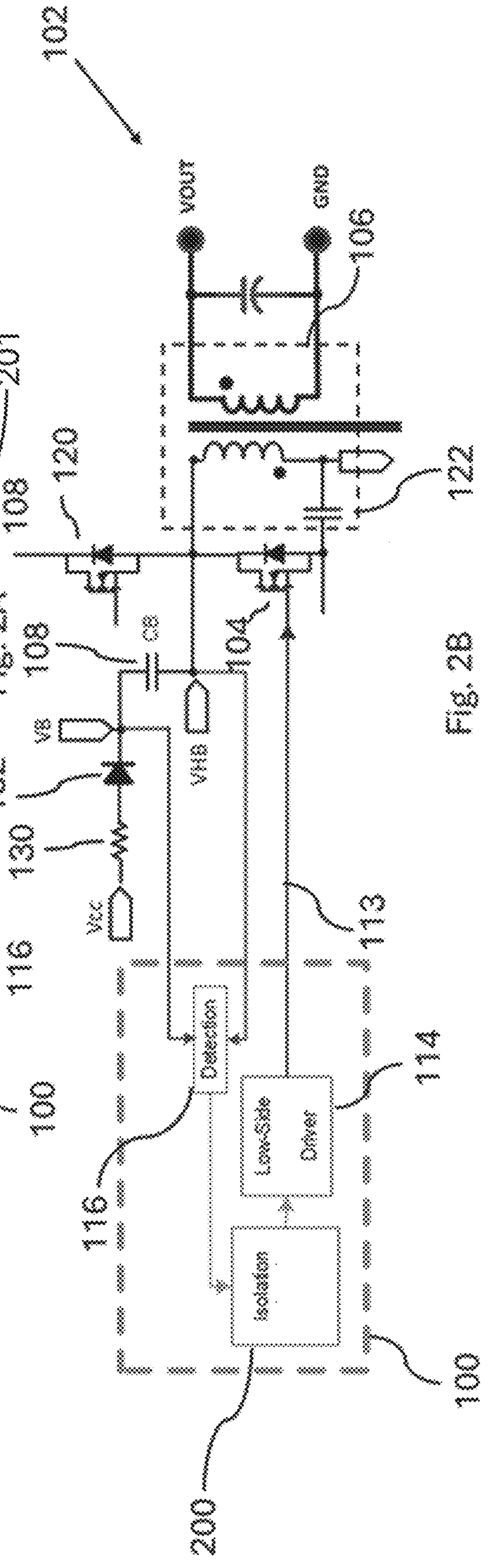
FIG. 2B is a schematic of a specific embodiment of the controller and the resonant converter in accordance with a fifth embodiment of the present disclosure.

FIG. 2B is a schematic of a specific embodiment of the controller 100 and the resonant converter 102 in accordance with a fifth embodiment of the present disclosure. The present embodiment relates to direct sensing of the voltage across the capacitor 108 using the detector 116.

In the present embodiment, the capacitor 108 is a bootstrap capacitor, the switch 104 is a low side switch, the capacitor 122 is a resonant capacitor and the switch 120 is a high side switch. The voltage VC1 across the capacitor 108 is equal to a bootstrap voltage VB minus a switching node voltage VHB, in the present example. In the present example, the voltage VC1 is the bootstrap capacitor voltage. During operation, the controller 100 is configured to provide the first charging pulses 112 to drive the switching of the low side switch (the switch 104) to charge the bootstrap capacitor (the capacitor 108), when in the second mode. The controller 100 may provide the first charging pulses 112 in response to the voltage VC1 falling below the first threshold voltage value.

In a specific embodiment of the controller 100 and the resonant converter 102, during the no/light load operation, the converter 102 will stop switching since output voltage will not drop to a sufficiently low level. The converter 102 will switch again when the output voltage Vout drops to a pre-defined level.

Since the gate driver 114 IC will consume power, it will drain energy from bootstrap capacitor (capacitor 108 on the present example) and eventually the voltage across the bootstrap capacitor will reduce if there is no charging. The way to charge the capacitor 108 fast is by turning on the low side switch (the switch 104) for a short time (normally microseconds but depends on bootstrap charging resistor 130 and Vcc level).

For a specific embodiment using direct sensing case, the charging pulses may be sent to the low side switch when the bootstrap capacitor voltage drops below threshold (for example, greater than or equal to UVLO which is the minimum voltage level to send out a gate driving MS pulse if DLR comes).

Figure 2C:
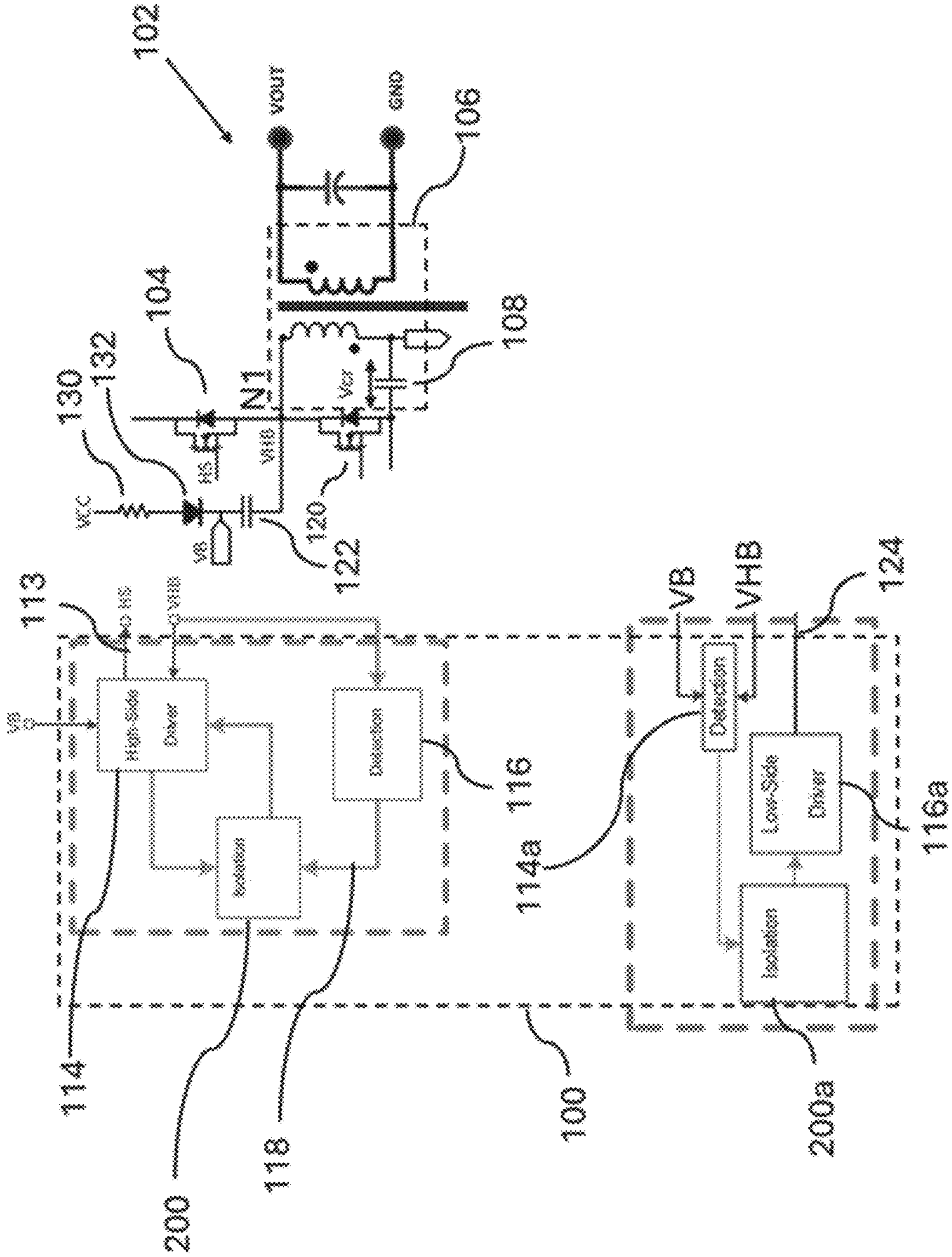
FIG. 2C is a schematic of a specific embodiment of the controller and the resonant converter in accordance with a sixth embodiment of the present disclosure.

FIG. 2C is a schematic of a specific embodiment of the controller 100 and the resonant converter 102 in accordance with a sixth embodiment of the present disclosure. The present embodiment, is a specific example of the embodiment presented in FIG. 1E. The controller 100 of the present embodiment comprises the features of the controllers of the embodiments presented in FIG. 2A and FIG. 2B for providing charge pulses for maintaining the voltages of both the resonant capacitor and the bootstrap capacitor, as required.

In the present embodiment, the controller 100 comprises a detector 116*a*, a gate driver 146*a* and an isolation circuit 200*a*.

In the present embodiment, the detector 116 is configured to detect the voltage Ver across the resonant capacitor 108, and the detector 116*a* is configured to detect the bootstrap capacitor voltage across the capacitor 122 by sensing the switching node voltage VHB and the bootstrap voltage VB at a bootstrap node between the diode 132 and the capacitor 122.

During operation, the controller 100 is configured to provide the first charging pulses 112 to drive the switching of the high side switch (the switch 104) to charge the resonant capacitor (the capacitor 108), when operating in the second mode. The controller 100 may provide the first charging pulses 112 in response to the voltage Ver falling below the first threshold voltage value, as sensed by the detector 116.

During operation, the controller 100 is configured to provide the second charging pulses 128 to drive the switching of the low side switch (the switch 120) to charge the bootstrap capacitor (the capacitor 122), when in the second mode. The controller 100 may provide the second charging pulses 128 in response to the voltage across the bootstrap capacitor, as determined by the detector 116*a*, falling below the second threshold voltage value.

Figure 3A:
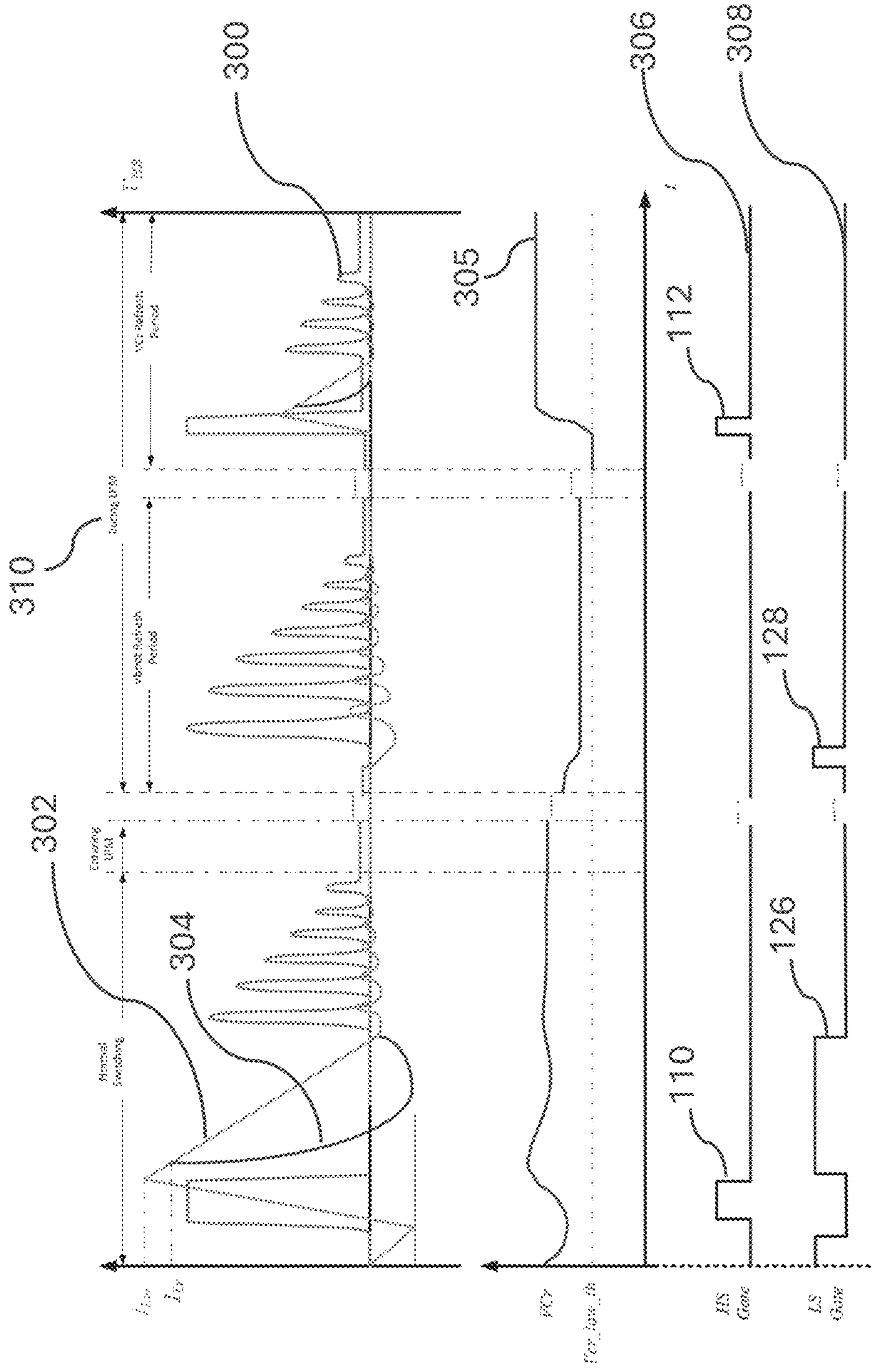
FIG. 3A is a graph showing simulation results for a practical implementation of the embodiment of the resonant converter as shown in FIG. 2C.

FIG. 3A is a graph showing simulation results for a practical implementation of the embodiment of the resonant converter 102 as shown in FIG. 2C. There is shown: a switching node voltage (a trace 300); the magnetizing current from the transformer (a trace 302), the resonant current from the transformer (a trace 304), the resonant capacitor voltage (a trace 305), the driving signal 113 (a trace 306), the driving signal 124 (a trace 308).

During operation, the converter 102 enters a low power mode over a time period labelled by the numeral 310).

The resonant capacitor voltage Ver is compared to the threshold value (labelled Vcr_low_th). When the resonant capacitor voltage Ver passes the threshold value during the low power mode, a first charging pulse 112 is provided to the high side switch (the switch 104) resulting in the charging of the resonant capacitor voltage Vcr. Similarly a second charging pulse 128 is provided to the low side switch (the switch 120) which results in the charging of the bootstrap capacitor (the capacitor 122).

It should be noted that the charging pulses (which may be referred to as "refreshing pulses") for charging the bootstrap capacitor and charging the resonant capacitor may be independent and they can happen together depending on the method of sensing. The charge pulses for the charging the resonant capacitor voltage Vcr may happen ahead of the bootstrap capacitor voltage refresh and the bootstrap capacitor voltage refresh could happen before the resonant capacitor Vcr refresh. "Refresh" refers to the charging of the capacitors.

In summary, embodiments of the present disclosure using bootstrap capacitor voltage refreshing pulse and resonant capacitor voltage Vcr refreshing pulse can improve resonant converter no/light load efficiency. Compared with the known methods that have a LPM time that can be hundreds of microseconds, embodiments of the present disclosure can provide an LPM duration that can be in the milliseconds or seconds range.

Figure 3B:
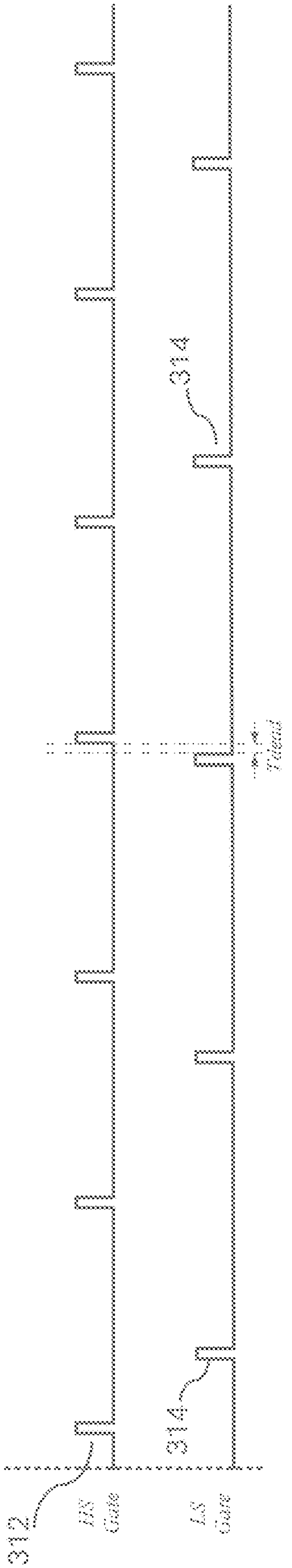
FIG. 3B is a graph showing further simulation results for a practical implementation of the embodiment of the resonant converter as shown in FIG. 2C.

FIG. 3B is a graph showing further simulation results for a practical implementation of the embodiment of the resonant converter 102 as shown in FIG. 2C. There is shown the driving signal 113 (a trace 312) and the driving signal 124

(a trace 314). The traces 312, 314 show example driving signals during the normal operational mode of the resonant converter 102. As denoted by "Tdead" the driving signals 113, 124 do not have overlapping high states in time such that the high side and low switches are not turned on together which would cause shoot-through.

In known systems, if the bootsrap capacitor voltage and the resonant capacitor voltage Vcr level are not maintained during low power operation mode (LPM), when dynamic load response (DLR) comes, additional LS and HS switching periods are required to charge up the bootstrap capacitor voltage and the resonant capacitor voltage Vcr, before the energy can be delivered to secondary side to boost the output Vout. Due to this delay time, the output Vout undershot will be worse.

In known systems, to keep both the bootstrap capacitor voltage and the resonant capacitor voltage Vcr above certain level, it is simply to shorten the LPM time and let converter switches more frequently. However, the no/light load efficiency will be compromised due to this simple design.

In known systems good dynamic load response performance and high light load efficiency cannot be met together. However, embodiments of the present disclosure provide an innovative method to improve light load efficiency, while maintaining the good transient response (dynamic load response or AC line transition) at light load conditions for resonant converters (AHB, LLC, etc).

Embodiments of the present disclosure can provide good light load efficiency and dynamic load response performance without making trade-offs.

Specifically, embodiments of the present disclosure may be used to maintain bootstrap capacitor and resonant capacitor energy during no/light load conditions. Embodiments of the present disclosure may significantly reduce the average switching frequency to improve the efficiency at no/light load conditions.

Embodiments of the present disclosure enable the power converter to exit the low power waiting period quickly and to deliver the energy to the load side in a short period of time (without the extra period to charge up the bootstrap capacitor voltage and the resonant capacitor Vcr, as is required in known systems).

In summary, embodiments of the present disclosure may provide:

1. Control for high side and low side switches during no load and light load condition.
2. Control for special handling at output voltage transient.

Common reference numerals and variables between figures represent common features.

Various improvements and modifications may be made without departing from the scope of the disclosure

The invention claimed is:

1. A controller for a resonant converter, the resonant converter comprising:
- a first switch;
- a resonant tank coupled to the first switch at a switching node; and
- a first capacitor;
- wherein the controller is configured to:
  - operate in a first mode by:
    - providing a plurality of first periodic control pulses to drive the switching of the first switch at a first switching frequency;
  - operate in a second mode by:
    - providing the plurality of first periodic control pulses to drive the switching of the first switch at a second switching frequency, the second switching frequency being less than the first switching frequency, or stopping providing the first periodic control pulses; and
    - providing one or more first charging pulses, each of the one or more first charging pulses driving the switching of the first switch to charge the first capacitor.

2. The controller of claim 1, wherein the first charging pulses comprises a plurality of periodic first charging pulses.

3. The controller of claim 2, wherein a first pulse width and/or a first charging pulse frequency of the periodic first charging pulses is determined based on a capacitance of the first capacitor and/or a resistance of a first discharge resistor.

4. The controller of claim 1, further comprising:
- a first gate driver configured to provide the one or more first charge pulses to the first switch; and
- a first detector configured to:
  - detect a first voltage across the first capacitor;
  - determine whether the first voltage is below a first threshold value; and
  - provide a first control signal to the first gate driver when the first voltage is below the first threshold value;
- wherein the first gate driver is configured to provide the one or more first charge pulses to the first switch to charge the first capacitor in response to receiving the first control signal from the first detector.

5. The controller of claim 4, further comprising an isolation circuit for providing electrical isolation, the first control signal being provided to the first gate driver via the isolation circuit.

6. The controller of claim 1, wherein the resonant converter comprises:
- a second switch coupled to the switching node; and
- a second capacitor.

7. The controller of claim 6, wherein the controller is configured to:
- operate in the first mode by:
  - providing a plurality of periodic second control pulses to drive the switching of the second switch at a third switching frequency;
- operate in a second mode by:
  - providing the plurality of periodic second control pulses to drive the switching of the second switch at a fourth switching frequency, the fourth switching frequency being less than the third switching frequency, or stopping providing the second periodic control pulses; and
  - providing one or more second charging pulses, each of the one or more second charging pulses driving the switching of the second switch to charge the second capacitor.

8. The controller of claim 7, wherein the controller is configured to drive the switching of the first and second switches such that both the first and second switches are not simultaneously on an on state.

9. The controller of claim 7, wherein:
- the first charging pulses comprises a plurality of periodic first charging pulses; and/or
- the second charging pulses comprises a plurality of periodic second charging pulses.

10. The controller of claim 9, wherein:
- a first pulse width and/or a first charging pulse frequency of the periodic first charging pulses is determined based on a capacitance of the first capacitor and/or a resistance of a first discharge resistor; and/or a second pulse width and/or a second charging pulse frequency of the periodic second charging pulses is determined based on a capacitance of the second capacitor and/or a resistance of a second discharge resistor or the load current discharged from the second capacitor or the load current to the second capacitor.

11. The controller of claim 7, comprising:

a first gate driver configured to provide the one or more first charge pulses to the first switch;

a second gate driver configured to provide the one or more second charge pulses to the second switch;

a first detector configured to:

detect a first voltage across the first capacitor; and determine whether the first voltage is below a first threshold value; and provide a first control signal to the first gate driver when the first voltage is below the first threshold value; and a second detector configured to:

detect a second voltage across the second capacitor;

determine whether the second voltage is below a second threshold value; and provide a second control signal to the second gate driver when the second voltage is below the second threshold value;

wherein:

the first gate driver is configured to provide the one or more first charge pulses to the first switch to charge the first capacitor in response to receiving the first control signal from the first detector; and the second gate driver is configured to provide the one or more second charge pulses to the second switch to charge the second capacitor in response to receiving the second control signal from the second detector.

12. The controller of claim 11, further comprising:

a first isolation circuit for providing electrical isolation, the first control signal being provided to the first gate driver via the first isolation circuit; and/or a second isolation circuit for providing electrical isolation, the second control signal being provided to the second gate driver via the second isolation circuit.

13. The controller of claim 11, wherein:

the first switch is a high side switch;

the second switch is a low side switch;

the first capacitor is a resonant capacitor, the resonant tank comprising the first capacitor; and the second capacitor is a bootstrap capacitor.

14. The controller of claim 13, wherein:

the resonant converter comprises a first resistor configured to be coupled to a supply voltage, and a first diode coupled to the first resistor and the second capacitor;

the resonant tank comprises a first inductor coupled to the switching node and the first capacitor; and the second capacitor is coupled to the switching node.

15. The controller of claim 14, wherein:

the first detector is configured to detect a first voltage across the first capacitor by sensing a switching node voltage at the switching node or at a first capacitor node; and the second detector is configured to detect a second voltage across the second capacitor by sensing the switching node voltage and a bootstrap voltage at a bootstrap node between the first diode and the second capacitor.

16. The controller of claim 1, wherein the resonant converter is an asymmetrical half-bridge resonant converter.

17. The controller of claim 1, wherein the second mode is a low power mode in which the resonant converter operates to provide a reduced load current when compared to the first mode.

18. The controller of claim 1, wherein the controller is configured to provide pulse frequency modulation (PFM) during the first and/or second mode.

19. An apparatus comprising:

a resonant converter comprising:

a first switch;

a resonant tank coupled to the first switch at a switching node; and a first capacitor; and a controller configured to:

operate in a first mode by:

providing a plurality of first periodic control pulses to drive the switching of the first switch at a first switching frequency;

operate in a second mode by:

providing the plurality of first periodic control pulses to drive the switching of the first switch at a second switching frequency, the second switching frequency being less than the first switching frequency, or stopping providing the first periodic control pulses; and providing one or more first charging pulses, each of the one or more first charging pulses driving the switching of the first switch to charge the first capacitor.

20. A method of controlling a resonant converter, the resonant converter comprising:

a first switch;

a resonant tank coupled to the first switch at a switching node; and a first capacitor;

wherein the method comprises:

operating a controller in a first mode in which the controller:

provides a plurality of first periodic control pulses to drive the switching of the first switch at a first switching frequency;

operating in the controller in a second mode in which the controller:

provides the plurality of first periodic control pulses to drive the switching of the first switch at a second switching frequency, the second switching frequency being less than the first switching frequency, or stops providing the first periodic control pulses; and provides one or more first charging pulses, each of the one or more first charging pulses driving the switching of the first switch to charge the first capacitor.

* * * * *